(12) United States Patent
McKenna et al.

(10) Patent No.: US 10,919,922 B2
(45) Date of Patent: Feb. 16, 2021

(54) BROAD SPECTRUM ANTIVIRAL COMPOUNDS

(71) Applicant: University of Southern California, Los Angeles, CA (US)

(72) Inventors: Charles E. McKenna, Pacific Palisades, CA (US); Boris A. Kashemirov, Los Angeles, CA (US); Jaijun Fan, Los Angeles, CA (US); Jinglei Lyu, Irvine, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 16/344,989

(22) PCT Filed: Oct. 31, 2017

(86) PCT No.: PCT/US2017/059254
§ 371 (c)(1),
(2) Date: Apr. 25, 2019

(87) PCT Pub. No.: WO2018/081785
PCT Pub. Date: May 3, 2018

(65) Prior Publication Data
US 2019/0270762 A1    Sep. 5, 2019

Related U.S. Application Data

(60) Provisional application No. 62/415,456, filed on Oct. 31, 2016.

(51) Int. Cl.
*C07F 9/6512* (2006.01)
*C07F 9/6561* (2006.01)

(52) U.S. Cl.
CPC ........ *C07F 9/65616* (2013.01); *C07F 9/6512* (2013.01)

(58) Field of Classification Search
CPC .......................... A61K 31/675; C07F 9/6512
USPC ........................................... 514/47; 544/244
See application file for complete search history.

*Primary Examiner* — Jeffrey H Murray
(74) *Attorney, Agent, or Firm* — Brooks Kushman P.C.

(57) ABSTRACT

Antiviral compounds comprising prodrugs with differing side chains derived from a tyrosine substance in the form of a tyrosine amide in which the amide substituent side chain is an alkyl ether, thioether, or alkene. Embodiments of the compounds have a range of effective lipophilicity values allowing variation in aqueous solubility, oral bioavailability, cell permeability and in vivo activation properties. The embodiments have promoieties derived from a single amino acid, which are expected to have low toxicity. The features described above also make possible a novel "precision medicine" approach to treatment of viral infections, whereby the prodrug variations can be exploited to match optimal activation of the prodrug to a given patient or strain of virus.

11 Claims, 4 Drawing Sheets

Table 1

| No. | Compound structure | logD at pH 7.4 |
|---|---|---|
| 15a | Chemical Formula: $C_{36}H_{58}N_7O_6P$<br>Molecular Weight: 715.8768 | 4.23 |
| 15b | Chemical Formula: $C_{35}H_{58}N_5O_7P$<br>Molecular Weight: 691.8508 | 4.11 |

FIG. 2

| | | |
|---|---|---|
| 15c | Chemical Formula: $C_{33}H_{54}N_7O_7P$<br>Molecular Weight: 691.81 | 1.99 |
| 15d | Chemical Formula: $C_{34}H_{56}N_7O_6PS$<br>Molecular Weight: 721.90 | 3.31 |
| 15e | Chemical Formula: $C_{36}H_{58}N_7O_6P$<br>Molecular Weight: 715.8768 | 4.23 |

FIG. 2 Cont.

| | | |
|---|---|---|
| 15f | Chemical Formula: $C_{35}H_{58}N_5O_7P$<br>Molecular Weight: 691.8508 | 4.11 |
| 15g | Chemical Formula: $C_{32}H_{54}N_5O_8P$<br>Molecular Weight: 667.78 | 1.88 |
| 15h | Chemical Formula: $C_{33}H_{56}N_5O_7PS$<br>Molecular Weight: 697.87 | 3.20 |

FIG. 2 Cont.

BROAD SPECTRUM ANTIVIRAL COMPOUNDS

CROSS-REFERENCE TO RELATED APPLICATIONS

This application claims the benefit of Provisional Patent Application No. 62/415,456, filed on Oct. 31, 2016, which is incorporated by reference herein.

STATEMENT REGARDING FEDERALLY SPONSORED RESEARCH OR DEVELOPMENT

This invention was made with Government support under Grant No. AI100401 and AI112185 from the National Institutes of Health. The Government has certain rights in this invention.

BACKGROUND

Field of the Invention

The invention relates to prodrugs of acyclic nucleoside phosphonates.

Related Art

Acyclic nucleoside phosphonates (ANPs) are broad spectrum antiviral agents that are highly potent against orthopox viruses, including cowpox, vaccinia, and variola (smallpox) virus.[1] The prototype member of the ANPs is (S)-9-(3hydroxy-2-phosphonyl-methoxypropyl)adenine ((S)-HPMPA, first described 1986 for its activity against DNA viruses.[2] Its cytosine analogue, (S)-HPMPC (cidofovir)[3] has been shown to have similar therapeutic potential against virtually all DNA viruses as well as other adeno-, papiloma-, polyoma-, and poxvirus infections. Cidofovir is used in the clinic for the treatment of AIDS patients infected with cytomegalovirus (CMV).

(S)-HPMPC is effective in vitro and in animal model infection but has low oral bioavailability, and must be delivered intravenously.[4] This condition limits the therapeutic scope of this and other ANP drugs. Moreover, after intravenous injection drugs of this class tend to accumulate in the kidney leading to renal toxicity.[5, 6] Thus, there is a need for more effective, orally bioavailable forms of these drugs. Several prodrug approaches to improve oral absorption of antiviral nucleoside analogues by incorporating various phosphonate anion masking groups have been developed.[7]

SUMMARY

Previously described is the installation of a benign promoiety, such as a single amino acid, dipeptide, or tripeptide containing a side chain hydroxy for esterification of the nucleotide phosphonic acid.[8] In a prior application,[9] tyrosine alkyl amide phosphonate ester conjugates of nucleotide drugs in which the amidoalkyl chain is longer than 5 carbon atoms and less than 19 carbon atoms were described.

In the present application, compounds that comprise prodrugs with differing side chains derived from a natural (tyrosine) substance are provided in the form of a tyrosine amide in which the amide substituent side chain is an alkyl ether, thioether, or alkene. Embodiments of the compounds have a range of effective lipophilicity values (distribution coefficients, Log D, Table 1)[10] allowing variation in aqueous solubility, oral bioavailability, cell permeability and in vivo activation properties. The embodiments have promoieties derived from a single amino acid, which are expected to have low toxicity. The features described above also make possible a novel "precision medicine" approach to treatment of viral infections, whereby the prodrug variations can be exploited to match optimal activation of the prodrug to a given patient or strain of virus.

In one aspect, a compound is provided having the following formula (I):

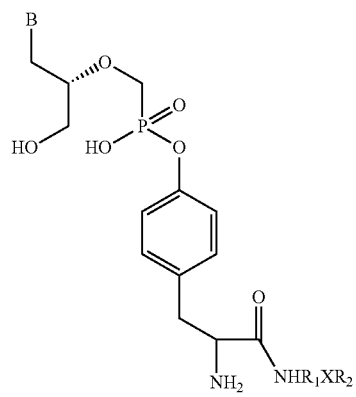

or a salt or a pharmaceutically acceptable salt thereof, where B is a naturally occurring or non-naturally occurring base; $R_1$ is a $C_2$-$C_{14}$ alkyl group; X is O, S, CH=CH (cis) or CH=CH (trans); and $R_2$ is a $C_2$-$C_{14}$ alkyl group. In some embodiments, B can be adenine or cytosine. In some embodiments, the compound can be any compound described in FIG. 1, FIG. 2 (Table 1), or Scheme 1.

In another aspect, a pharmaceutical composition is provided. The composition includes a compound of formula (I), or a pharmaceutically acceptable salt thereof, or a combination thereof, and a pharmaceutically acceptable carrier. In some embodiments, the compound can be any compound described in FIG. 1, FIG. 2 (Table 1), or Scheme 1, or a pharmaceutically acceptable salt thereof, or a combination thereof.

In a further aspect, a method of inhibiting viral replication in a virus-infected cell is provided. The method includes exposing the cell in culture to a compound of formula (I), or a pharmaceutically acceptable salt thereof, or a combination thereof. In some embodiments, the compound can be any compound described in FIG. 1, FIG. 2 (Table 1), or Scheme 1, or a pharmaceutically acceptable salt thereof, or a combination thereof.

In another aspect, a method of treating a virus infection in a subject in need thereof, is provided. The method includes administering to the subject a therapeutically effective amount of a compound of Formula (I), or a pharmaceutically acceptable salt thereof, or a combination thereof. In some embodiments, the compound can be any compound described in FIG. 1, FIG. 2 (Table 1), or Scheme 1, or a pharmaceutically acceptable salt thereof, or a combination thereof.

In a further aspect, a method of preparing an acyclic nucleoside phosphonate is provided. The method includes: reacting a Boc-protected amino acid amide with (5)-HPMPA or (S)-HPMPC to form a Boc-protected cyclic nucleoside phosphonate; deprotecting the cyclic nucleoside phosphonate; and ring-opening the deprotected cyclic nucleoside phosphonate to produce an acyclic nucleoside phosphonate.

In some embodiments, the Boc-protected amino acid amide is (S,Z)-2-amino-3-(4-hydroxyphenyl)-N-(octadec-9-en-1-yl)propanamide, (S,E)-2-amino-3-(4-hydroxyphenyl)-N-(octadec-9-en-1-yl)propanamide, tert-butyl (3-(4-hydroxyphenyl)-1-((7-(octyloxy)heptyl)amino)-1-oxopropan-2-yl) carbamate, or tert-butyl (3-(4-hydroxyphenyl)-1-((7-(octylthio)heptyl)amino)-1-oxopropan-2-yl)carbamate. In some embodiments, the method includes performing the method of Scheme 1. In accordance with Scheme 1, B can be a naturally occurring or non-naturally occurring base, and Y can be $NHR_1XR_2$, wherein X is O, S, CH=CH (cis) or CH=CH (trans), and $R_1$ and $R_2$ are each independently a $C_2$-$C_8$ alkyl group. In some embodiments of the method, B is adenine or cytosine.

BRIEF DESCRIPTION OF THE DRAWINGS

For a more complete understanding of the present invention, reference is now made to the following descriptions taken in conjunction with the accompanying drawings, in which:

FIG. 2 shows Table 1 which lists various compounds.

DETAILED DESCRIPTION

Figure 1:
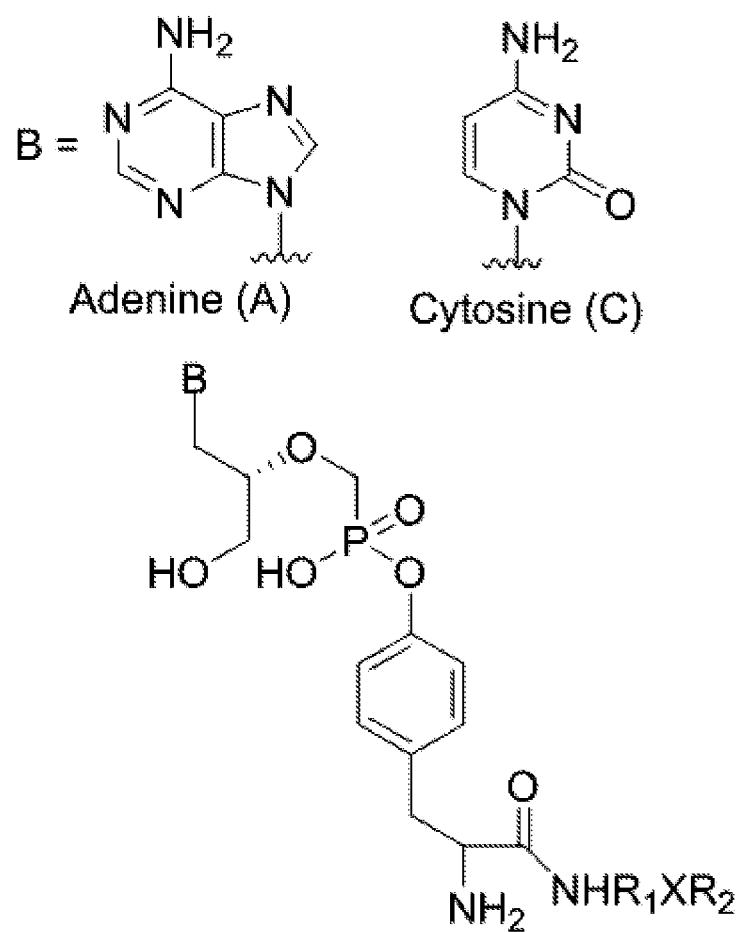
FIG. 1 is a panel showing the general structure of the new drug conjugates. The figure describes the general structure of embodiments of the new (S)-HPMPC (Cidofovir) and (S)-HPMPA prodrugs, where $R_1$ is a $C_2$-$C_{14}$ alkyl group; X is O, S, CH=CH (cis) or CH=CH (trans); and $R_2$ is a $C_2$-$C_{14}$ alkyl group.

In various aspects, compounds, pharmaceutical compositions containing the compounds, and methods of using the compounds, are provided.

In various embodiments, examples of naturally occurring bases include, but are not limited to, adenine, guanine, cytosine, uracil and thymine; examples of non-naturally occurring bases include, but are not limited to, 2,4-diaminopyrimidine, 2,6-diaminopurine, 8-azaadenine, 5-azacytosine, 7-deazaadenine, 7-deazaguanine.

The synthesis of acyclic nucleoside phosphonates 15a-15h is shown in Scheme 1.

Scheme 1

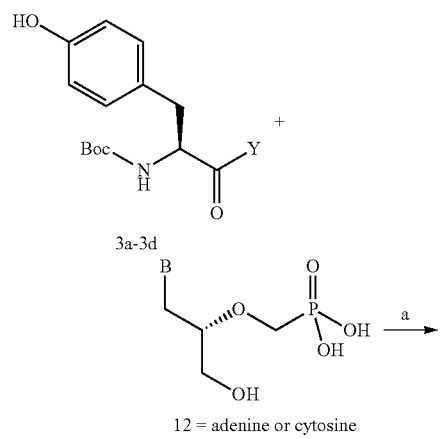

12 = adenine or cytosine

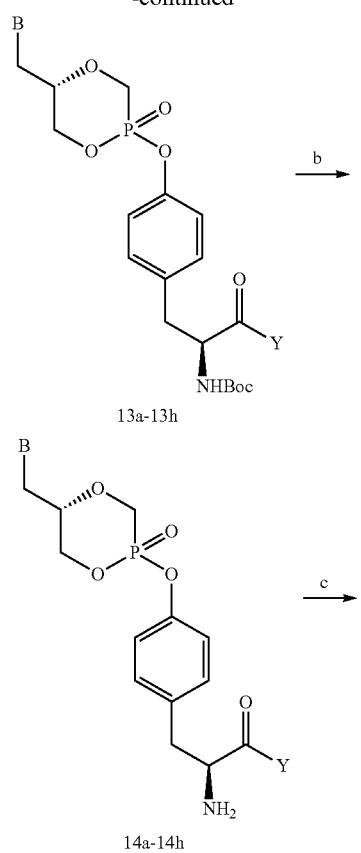

13a-13h 14a-14h

B = adenine
a Y = $NHC_8H_{16}CH=CHC_8H_{17}$(cis)
b Y = $NHC_8H_{16}CH=CHC_8H_{17}$(trans)
c Y = $NHC_7H_{14}OC_8H_{17}$
d Y = $NHC_7H_{14}SC_8H_{17}$

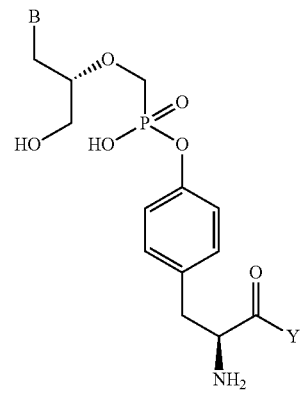

15a-15h

B = cytosine
e Y = $NHC_8H_{16}CH=CHC_8H_{17}$(cis)
f Y = $NHC_8H_{16}CH=CHC_8H_{17}$(trans)
g Y = $NHC_7H_{14}OC_8H_{17}$
h Y = $NHC_7H_{14}SC_8H_{17}$ Scheme 1. a) PyBop, DIEA, DMF, 40° C.; b) TFA, DCM, rt.; c) aq. $NH_4OH$ (14.8M), MeCN The synthesis of amino acid promoieties 3a-3d is shown in Schemes 2-4.

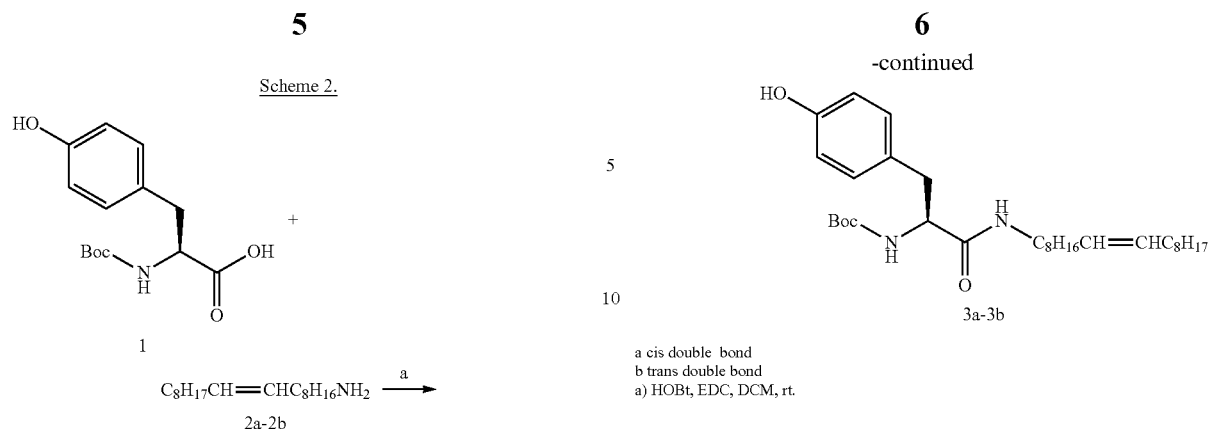
Scheme 2.
a cis double bond
b trans double bond
a) HOBt, EDC, DCM, rt.
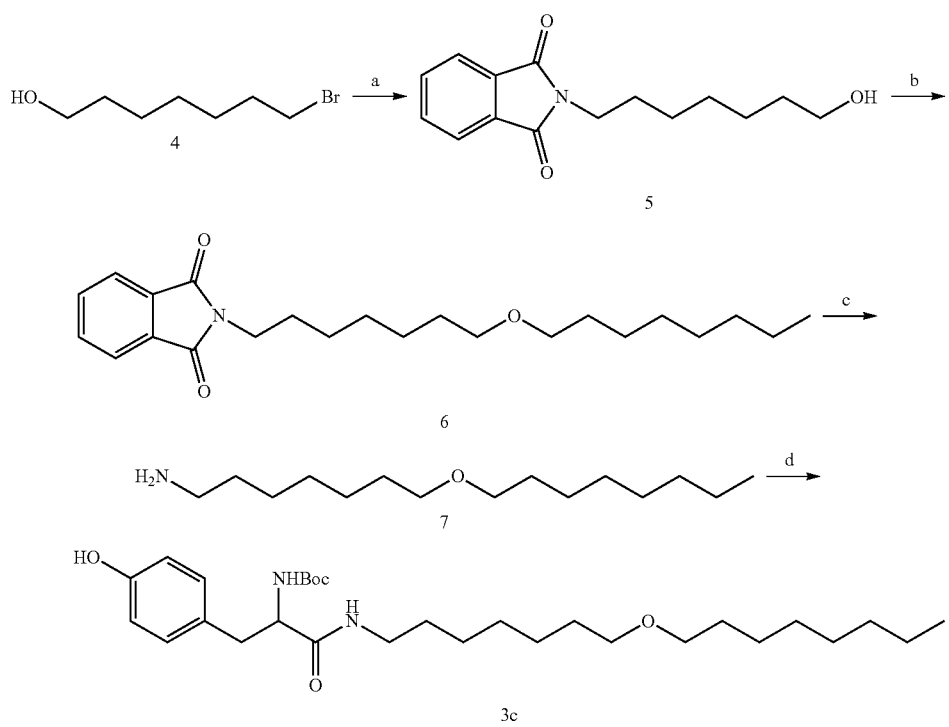
Scheme 3.
a) Potassium phthalimide, DMF, b) 1-bromooctane, NaH, DMF, c) hydrazine, EtOH, d) N—Boc tyrosine, e) EDC, HOBt, DCM
Scheme 4.
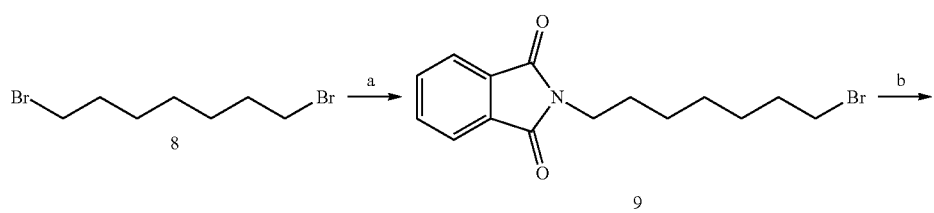

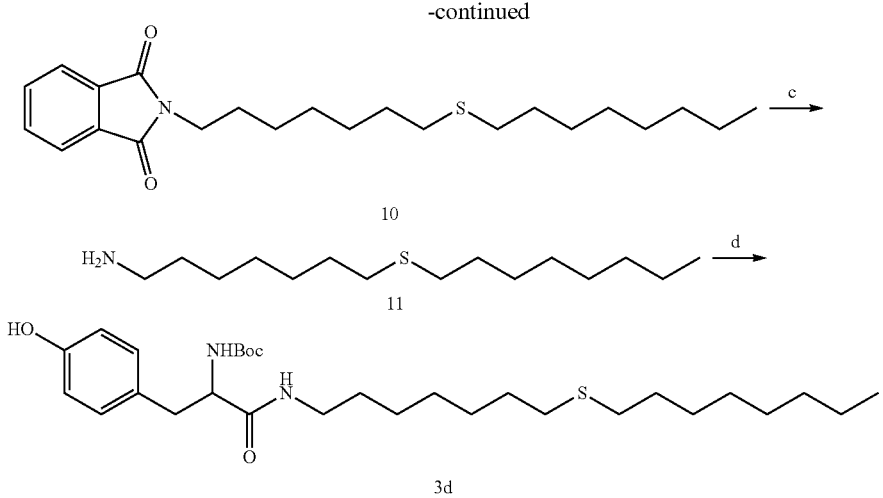

3d a) potassium phthalimide, DMF, b) 1-bromooctane, thiourea, NaOH, 10 wt % TX-X100/H2O, c) hydrazine, EtOH, d) N—Boc tyrosine, e) EDC, HOBt, DCM A salt of an acyclic nucleoside phosphonate may be a pharmaceutically acceptable salt. Pharmaceutically acceptable salts are well known in the art and include salts prepared from pharmaceutically acceptable non-toxic acids, including inorganic acids and organic acids. Suitable non-toxic acids include inorganic and organic acids such as acetic, benzenesulfonic, benzoic, camphorsulfonic, citric, ethenesulfonic, fumaric, gluconic, glutamic, hydrobromic, hydrochloric, isethionic, lactic, maleic, malic, mandelic, methanesulfonic, mucic, nitric, pamoic, pantothenic, phosphoric, succinic, sulfuric, tartaric acid, p-toluenesulfonic acids, and the like. Salts formed with, for example, a free carboxy group of an amino acid residue or a peptide, can be derived from inorganic bases including, but not limited to, sodium, potassium, ammonium, calcium or ferric hydroxides, and organic bases including, but not limited to, isopropylamine, trimethylamine, histidine, and procaine.

In methods of treating virus infection or inhibiting virus replication, an effective amount, which can be a therapeutically effective amount, of an acyclic nucleoside phosphonate, or a salt or pharmaceutically acceptable salt thereof, may be administered. A therapeutically effective amount of a compound is an amount that results in an improvement or a desired change in condition for which a compound is administered, when the compound is administered once or over a period of time. For example, with respect to virus infections, the improvement can be a lowering of virus titer, or a reduction in the symptoms or discomfort associated with a viral infection. As is known, the amount will vary depending on such particulars as the type of virus infection, the condition being treated, the specific acyclic nucleoside phosphonate compound utilized, the severity of the condition, and the characteristics of the subject. The subject can be a patient, and can be a person or another animal, such as another mammal.

A pharmaceutical composition will typically contain a pharmaceutically acceptable carrier. Although oral administration is a desired route of administration, other means of administration such as nasal, topical or rectal administration, or by injection or inhalation, are also contemplated. Depending on the intended mode of administration, the pharmaceutical compositions may be in the form of solid, semi-solid or liquid dosage forms, such as, for example, tablets, suppositories, pills, capsules, powders, liquids, suspensions, ointments or lotions, preferably in unit dosage form suitable for single administration of a precise dosage. The compositions may include an effective amount of a selected compound in combination with a pharmaceutically acceptable carrier and, in addition, may include other pharmaceutical agents such as another anti-viral agents, adjuvants, diluents, buffers, and the like. The compound may thus be administered in dosage formulations containing conventional non-toxic pharmaceutically acceptable carriers, adjuvants and vehicles. The amount of active compound administered will be dependent on the subject being treated, the subjects weight, the manner of administration and the judgment of the prescribing physician.

For solid compositions, conventional nontoxic solid carriers include, for example, pharmaceutical grades of mannitol, lactose, starch, magnesium stearate, sodium saccharin, talc, cellulose, glucose, sucrose, magnesium carbonate, and the like. Liquid pharmaceutically administrable compositions may, for example, be prepared by dissolving, dispersing, etc., an active compound as described herein and optional pharmaceutical adjuvants in an excipient, such as, for example, water, saline, aqueous dextrose, glycerol, ethanol, and the like, to thereby form a solution or suspension. If desired, the pharmaceutical composition to be administered may also contain minor amounts of nontoxic auxiliary substances such as wetting or emulsifying agents, pH buffering agents and the like, for example, sodium acetate, sorbitan mono-laurate, triethanolamine acetate, triethanolamine oleate, etc. Actual methods of preparing such dosage forms are known, or will be apparent, to those skilled in this art. For oral administration, the composition will generally take the form of a tablet or capsule, or may be an aqueous or nonaqueous solution, suspension or syrup. Tablets and capsules for oral use will generally include one or more commonly used carriers such as lactose and corn starch. Lubricating agents, such as magnesium stearate, are also typically added. When liquid suspensions are used, the active agent may be combined with emulsifying and suspending agents. If desired, flavoring, coloring and/or sweetening agents may be added as well. Other optional components for incorporation into an oral formulation herein include, but are not limited to, preservatives, suspending agents, thickening agents, and the like.

In embodiments that include a method of inhibiting viral replication or a method of treating a virus infection, the virus may be a DNA virus, which may include, but is not limited to, members of the Herpesviridae, Adenoviridae, Polyomaviridae, Poxviridae, Papillomaviridae, Anelloviridae or Parvoviridae families of viruses. Examples of particular viruses include, but are not limited to, cowpox, vaccinia, monkeypox, smallpox, other poxviruses including variola virus and drug-resistant strains thereof, Herpes simplex I, Herpes simplex II, cytomegalovirus, Varicella-Zoster Virus, Epstein-Barr Virus, Human Herpes Virus Type 6, Human Herpes Virus Type 8, Papilomavirus, BK virus and Adenovirus. The virus may also be an RNA virus, which may include, but is not limited to, members of the Retroviridae or Hepadnaviridae. Examples of particular viruses include, but are not limited to, HIV and hepatitis A, B or C virus. When inhibiting viral replication or treating a virus infection, an antiviral compound, or a salt thereof, or a combination thereof, may be applied or administered. The virus-infected cell may be in an individual, may be in an isolated organ, or may be in culture. An individual may be a person or an animal.

The present invention may be better understood by referring to the accompanying examples, which are intended for illustration purposes only and should not in any sense be construed as limiting the scope of the invention.

Example 1

Synthesis of Tyrosine Amide Promoieties 3a-3b.

To a suspension of Boc-(L)-tyrosine (commercially available) (9.4 mmol, 2.64 g) 1 in DCM (60 ml) were added N-hydroxybenzotriazole (HOBt) hydrate (14.1 mmol, 1.91 g) and corresponding amine (10 mmol) 2. The reaction mixture was cooled to 0-5° C. before 1-ethyl-3-(3-dimethylaminopropyl)-carbodiimide (EDC) hydrochloride (11.8 mmol, 2.25 g) was added. The reaction mixture was stirred at room temperature for 24 h. An additional 70 ml of DCM was added, and the organic layer was washed consecutively with 1.6 M citric acid (25 ml), saturated NaHCO$_3$ (25 ml), and saturated NaCl (40 ml) aqueous solution. The organic phase was dried over Na$_2$SO$_4$ and concentrated under vacuum. Obtained crude product was purified by silica gel column chromatography to give product 3.

(S,Z)-2-amino-3-(4-hydroxyphenyl)-N-(octadec-9-en-1-yl)propanamide 3a

Yield 78%. $^1$H NMR (400 MHz, CDCl$_3$): δ 7.04-7.01 (m, 2H, aromatic), 6.70-6.77 (m, 2H, aromatic), 5.46-5.30 (m, J=14.4 Hz, 2H, CH=CH), 4.16-4.13 (m, 1H, CHNH$_2$), 3.17-3.14 (m, 2H, CH$_2$CH$_2$NH), 2.93-2.88 (dd, J=13.8, 6.1 Hz, 1H, CH$_a$H$_b$(Tyr)), 2.75-2.70 (dd, J=13.8, 6.1 Hz, 1H, CH$_a$H$_b$(Tyr)), 1.97-1.95 (m, 4H, CH$_2$CH=CHCH$_2$), 1.38-1.28 (m, 33H, Boc, 12CH$_2$), 0.91-0.88 (m, 3H, CH$_3$CH$_2$). LR-MS: m/z calcd 529.4011 (M-H)$^-$, found 529.59 (M-H)$^-$.

(S,E)-2-amino-3-(4-hydroxyphenyl)-N-(octadec-9-en-1-yl)propanamide 3b

Yield 82%. $^1$H NMR (400 MHz, CDCl$_3$): δ 7.03-7.01 (m, 2H, aromatic), 6.70-6.78 (m, 2H, aromatic), 5.42-5.32 (m, J=19.0 Hz, 2H, CH=CH), 4.16-4.13 (m, 1H, CHNH$_2$), 3.17-3.14 (m, 2H, CH$_2$CH$_2$NH), 2.93-2.88 (dd, J=13.8, 6.1 Hz, 1H, CH$_a$H$_b$(Tyr)), 2.75-2.70 (dd, J=13.8, 6.1 Hz, 1H, CH$_a$H$_b$(Tyr)), 1.97-1.95 (m, 4H, CH$_2$CH=CHCH$_2$), 1.38-1.28 (m, 33H, Boc, 12CH$_2$), 0.91-0.88 (m, 3H, CH$_3$CH$_2$). LR-MS: m/z calcd 529.4011 (M-H)$^-$, found 529.59 (M-H)$^-$.

Synthesis of Tyrosine Amide Promoieties 3c-3d 2-(7-hydroxyheptyl)isoindoline-1,3-dione 5

To a solution of 7-bromoheptan-1-ol 4 (1.97 mL) in dry DMF was added solid potassium phthalimide (3.56 g, 19.2 mmol). The white suspension was heated to 70° C. at N$_2$ protection for 1 h. The reaction was monitored by TLC. After reaction, DMF was removed under reduced pressure. The residue was suspended in DCM and filtered and washed by DCM. The crude product, 2-(7-hydroxyheptyl)isoindoline-1,3-dione 5, was dried and went to the next step without further purification. Yield=89%.

2-(7-(octyloxy)heptyl)isoindoline-1,3-dione 6

349 mg NaH (60%, suspended in oil) was weighted in a dry flask and mixed with dry DMF (3 mL). The mixture was stirred under N$_2$ at 0° C. 2-(7-hydroxyheptyl)isoindoline-1,3-dione 5 (1.90 g) which was dissolved in another dry DMF (3 mL) was added to the mixture in dropwise for 20 minutes. After adding all materials, the reaction mixture was stirred for another 20 minutes at 0° C. Then the reaction was stirred at room temperature for 24 h. The reaction was monitored by TLC. Extra NaH was quenched in methanol. The solvent was removed under reduced pressure. The product was purified by chromatography. Yield=40%.

7-(octyloxy)heptan-1-amine 7

4.0 g 2-(7-(octyloxy)heptyl)isoindoline-1,3-dione 6 was dissolved in ethanol (125 mL). Then hydrazine monohydrate (1.88 g) was added to the solution. The reaction was heated to refluxing temperature for 2 h. A lot of white precipitate was filtered and washed by cold ethanol. The crude product was dried under reduced pressure and purified by chromatography. Yield=86%.

tert-butyl (3-(4-hydroxyphenyl)-1-((7-(octyloxy)heptyl)amino)-1-oxopropan-2-yl)carbamate 3c To a suspension of N-Boc tyrosine (1.83 g) suspended in dry DCM (42 mL) was added HOBt (1.01 g). After the reaction mixture was stirred under N$_2$ for 5 min, 7-(octyloxy)heptan-1-amine 7 (1.45 g) was added to the suspension. After another 15 minutes, EDC (1.43 g) was added. The reaction was stirred under N$_2$ for 24 h and monitored by 1H NMR. The solvent was removed by reduced pressure. The product was purified by chromatography. Yield=70%.
$^1$H NMR (400 MHz, CDCl$_3$): δ 7.07-7.03 (m, 2H, aromatic), 6.77-6.73 (m, 2H, aromatic), 4.18-4.15 (m, 1H, CHNH$_2$), 3.50-3.42 (m, 4H, CH$_2$OCH$_2$), 3.19-3.16 (m, 2H, CH$_2$CH$_2$NH), 2.93-2.88 (dd, J=13.8, 6.1 Hz, 1H, CH$_a$H$_b$(Tyr)), 2.75-2.70 (dd, J=13.8, 6.1 Hz, 1H, CH$_a$H$_b$(Tyr)), 1.56-1.50 (m, 4H, CH$_2$CH$_2$OCH$_2$CH$_2$), 1.38-1.28 (m, 18H, Boc, 12CH$_2$), 0.92-0.89 (m, 3H, CH$_3$CH$_2$). LR-MS: m/z calcd 505.37 (M-H)$^-$, found 505.59 (M-H)$^-$.

2-(7-bromoheptyl)isoindoline-1,3-dione 9

To a solution of 1,7-dibromoheptane (10.9 g) in dry DMF was added solid potassium phthalimide (7.4 g). The white suspension was heated to 70° C. under N$_2$ protection for 1 h. The reaction was monitored by TLC. After reaction, DMF was removed under reduced pressure. The residue was suspended in DCM and filtered and washed by DCM. The crude product, 2-(7-bromoheptyl)isoindoline-1,3-dione was dried and went to the next step without further purification. Yield=52%.

2-(7-(octylthio)heptyl)isoindoline-1,3-dione 10

To a 500 mL RBF was added NaOH solution (3.67 g), which was dissolved in H$_2$O (138 mL). Then TX-X100 (14.4 mL) was added and stirred completely to a clear micelles solution. After, thiourea (4.66 g) was added to this solution. Then 2-(7-bromoheptyl)isoindoline-1,3-dione and bromooctane (7.07 mL) were added. These two organic compounds did not dissolve at first. After stirring about 2 min, the white suspension disappeared and an almost clear solution was obtained. The solution was heated to 50° C. for 48 h. The reaction was monitored by 1H NMR. Most of the TX-X100 was removed by extraction using DCM. The aqueous layer was acidified to pH=2.0 by adding 1N HCl solution. Then it was extracted by DCM. The DCM was removed under reduced pressure. The product was purified by chromatography. Yield=55%

7-7-(octylthio)heptan-1-amine 11

1.7 g 2-(7-(octylthio)heptyl)isoindoline-1,3-dione was dissolved in ethanol (55 mL). Then hydrazine monohydrate (0.70 mL) was added to the solution. The reaction was heated to refluxing temperature for 2 h. A lot of white precipitate was filtered and washed by cold ethanol. The crude product was dried under reduced pressure and purified by chromatography. Yield=81%.

tert-butyl (3-(4-hydroxyphenyl)-1-((7-(octylthio)heptyl)amino)-1-oxopropan-2-yl)carbamate 3d To a suspension of N-Boc tyrosine (397 mg) suspended in dry DCM (9.0 mL) was added HOBt (217 mg). After the reaction mixture was stirred under $N_2$ for 5 minutes, 7-(octylthio)heptan-1-amine (350 mg) was added to the suspension. After another 15 minutes, EDC (307 mg) was added. The reaction was stirred under $N_2$ for 24 h and monitored by 1H NMR. The solvent was removed under reduced pressure. The product was purified by chromatography. Yield=63%.
$^1$H NMR (400 MHz, CDCl$_3$): δ 7.08-7.04 (m, 2H, aromatic), 6.78-6.74 (m, 2H, aromatic), 4.15-4.12 (m, 1H, CHNH$_2$), 3.19-3.16 (m, 2H, CH$_2$CH$_2$NH), 2.93-2.88 (dd, J=13.8, 6.1 Hz, 1H, CH$_a$H$_b$(Tyr)), 2.75-2.70 (dd, J=13.8, 6.1 Hz, 1H, CH$_a$H$_b$(Tyr)), 2.50-2.26 (m, 4H, CH$_2$OCH$_2$), 1.59-1.52 (m, 4H, CH$_2$CH$_2$SCH$_2$CH$_2$), 1.38-1.28 (m, 18H, Boc, 12CH$_2$), 0.88-0.85 (m, 3H, CH$_3$CH$_2$). LR-MS: m/z calcd 521.35 (M-H)$^-$, found 521.58 (M-H)$^-$.

Synthesis of Tyrosine Amide Acyclic (S)-HPMPA or (S)-HPMPC Prodrugs 15a-15 h General Procedure To a suspension of (S)-HPMPA or (S)-HPMPC 12 (0.6 mmol) in dry DMF (11.7 mL) were added dry DIEA (11.5 mmol), amino acid promoiety 3 (0.9 mmol), and (benzotriazol-1-yloxy)tripyrrolidino-phosphonium hexafluorophosphate (PyBOP) (1.2 mmol). The reaction mixture was stirred under $N_2$ at 40° C. for 2 h. The reaction was monitored by $^{31}$P NMR, and additional portions of PyBOP were added as necessary. After reaction completion, DMF and DIEA were removed under vacuum. The residue was then purified using silica gel column chromatography to give crude product 13. To a suspension of Boc-protected intermediate 13 in DCM (5 mL) was added TFA (1.5 mL) dropwise at 0° C. Then the reaction mixture was stirred at room temperature overnight. Volatiles were removed under vacuum and the residue 14 was put into next step without further purification. 18.2 mL 14.8 M NH$_4$OH was added to 136.5 mL MeCN and then thoroughly mixed. Next, 80 mL NH$_4$OH/MeCN solution was added to the round bottom flask containing (S)-HPMPA tyrosine N-alkyl amide prodrug 14. The mixture was shaken, swirled until the prodrug dissolved. Once all the prodrug 14 dissolved, the remaining NH$_4$OH/MeCN were added to the round bottom flask. The reaction mixture was stirred at 45° C. under $N_2$ protection, and monitored by $^{31}$P NMR until all the starting material disappeared. After reaction completion, volatiles were evaporated under vacuum and the residue was purified by silica gel column chromatography to give product 15 as white solid.

4-((S)-2-amino-3-(((Z)-octadec-9-en-1-yl)amino)-3-oxopropyl)phenyl hydrogen ((((S)-1-(6-amino-9H-purin-9-yl)-3-hydroxypropan-2-yl)oxy)methyl)phosphonate 15a Overall yield 24%. Obtained as TFA salt. $^1$H NMR (400 MHz, CD$_3$OD): δ 8.18 (s, 1H), 8.16 (s, 1H), 7.12-7.10 (m, 2H, aromatic), 7.04-7.02 (m, 2H, aromatic), 5.35-5.32 (m, J=14.4 Hz, 2H, CH=CH), 4.48-4.35 (m, 2H, CH$_2$N), 3.86-3.81 (m, 2H, CHOH, CHNH$_2$), 3.79-3.75 (dd, J=8.2, 12.2 Hz, 1H, CH$_a$H$_b$P), 3.73-3.65 (m, 2H, CH$_a$H$_b$P, CH$_a$H$_b$O), 3.54-3.50 (dd, J=4.6, 12.4 Hz, 1H, CH$_a$H$_b$P), 3.23-3.16 (m, 2H, NHCH$_2$), 3.14-3.08 (dd, J=6.0, 14.1 Hz, 1H, CH$_a$H$_b$ (Tyr)), 2.90-2.85 (dd, J=8.5, 14.0 Hz, 1H, CH$_a$H$_b$(Tyr)), 2.03-1.95 (m, 4H, CH$_2$CH=CHCH$_2$), 1.48 (m, 2H, COCH$_2$CH$_2$), 1.34-1.28 (m, 22H, 11CH$_2$), 0.91-0.88 (m, 3H, CH$_3$CH$_2$). $^{31}$P NMR (500 MHz, CD$_3$OD): δ 13.70 (s). LR-MS: m/z calcd 714.4113 (M-H)$^-$, found 718.64 (M-H)$^-$.

4-((S)-2-amino-3-(((E)-octadec-9-en-1-yl)amino)-3-oxopropyl)phenyl hydrogen ((((S)-1-(6-amino-9H-purin-9-yl)-3-hydroxypropan-2-yl)oxy)methyl)phosphonate 15b Overall yield 31%. Obtained as TFA salt. $^1$H NMR (400 MHz, CD$_3$OD): δ 8.17 (s, 1H), 8.16 (s, 1H), 7.12-7.10 (m, 2H, aromatic), 7.04-7.02 (m, 2H, aromatic), 5.38-5.36 (m, J=19.0 Hz, 2H, CH=CH), 4.47-4.35 (m, 2H, CH$_2$N), 3.97-3.91 (dd, J=6.0, 8.8 Hz, 1H, CHNH$_2$), 3.85-3.83 (m, 1H, CHOH), 3.80-3.75 (dd, J=8.2, 12.2 Hz, 1H, CH$_a$H$_b$P), 3.73-3.65 (m, 2H, CH$_a$H$_b$P, CH$_a$H$_b$O), 3.54-3.50 (dd, J=4.6, 12.4 Hz, 1H, CH$_a$H$_b$P), 3.22-3.16 (m, 2H, NHCH$_2$), 3.15-3.12 (dd, J=6.0, 14.1 Hz, 1H, CH$_a$H$_b$(Tyr)), 2.94-2.88 (dd, J=8.5, 14.0 Hz, 1H, CH$_a$H$_b$(Tyr)), 1.98-1.94 (m, 4H, CH$_2$CH=CHCH$_2$), 1.47 (m, 2H, COCH$_2$CH$_2$), 1.34-1.28 (m, 22H, 11CH$_2$), 0.91-0.88 (m, 3H, CH$_3$CH$_2$). $^{31}$P NMR (500 MHz, CD$_3$OD): δ 13.90 (s). LR-MS: m/z calcd 714.4113 (M-H)$^-$, found 718.64 (M-H)$^-$.

4-((S)-2-amino-3-((7-(octyloxy)heptyl)amino)-3-oxopropyl)phenyl hydrogen ((((S)-1-(6-amino-9H-purin-9-yl)-3-hydroxypropan-2-yl)oxy)methyl)phosphonate 15c Overall yield 21%; 1H NMR (400 MHz, CD$_3$OD) δ 8.17 (s, 1H, 2-H), 8.14 (s, 1H, 8-H), 7.08-7.02 (m, 4H, aromatic (Tyr)), 4.42-4.35 (m, 2H, CH$_a$H$_b$N), 3.83-3.72 (m, 3H, CHNH, CH$_2$OH), 3.79-3.64 (m, 2H, CH$_a$H$_b$P), 3.59-3.52 (dd, 1H, CHNH), 3.40-3.38 (m, 4H, CH$_2$OCH$_2$), 3.20-3.12 (m, 2H, CH$_2$NHCO), 3.08-3.05 (m, 1H, J=3.5, 10.3 Hz, CH$_a$H$_b$(Tyr)), 2.88-2.84 (m, 1H, CH$_a$H$_b$ (Tyr))), 1.56-1.50 (m, 4H, CH$_2$CH$_2$OCH$_2$CH$_2$), 1.48-1.43 (m, 2H, NHCH$_2$CH$_2$), 1.33-1.28 (m, 14H, 7CH$_2$), 0.91-0.87 (t, 3H, CH$_3$CH$_2$), $^{31}$P NMR (202 MHz, CD$_3$OD) δ 13.22. LR-MS: m/z calcd 690.38 (M-H)$^-$, found 690.55 (M-H)$^-$.

4-((S)-2-amino-3-((8-(octylthio)octyl)amino)-3-oxopropyl)phenyl hydrogen ((((S)-1-(6-amino-9H-purin-9-yl)-3-hydroxypropan-2-yl)oxy)methyl)phosphonate 15d Overall yield 19%; 1H NMR (400 MHz, CD$_3$OD) δ 8.16-8.15 (m, 2H, 2-H, 8-H), 7.12-7.00 (m, 4H, aromatic (Tyr)), 4.47-4.35 (m, 2H, CH$_a$H$_b$N), 3.94-3.64 (m, 5H, CHNH, CH$_2$OH, CH$_a$H$_b$P), 3.21-3.06 (m, 3H, CH$_2$NHCO, CH$_a$H$_b$(Tyr)), 2.94-2.90 (m, 1H, CH$_a$H$_b$ (Tyr)), 2.49-2.45 (m, 4H, CH$_2$SCH$_2$), 3.08-3.05 (m, 1H, J=3.5, 10.3 Hz, CH$_a$H$_b$(Tyr)), 2.88-2.84 (m, 1H, CH$_a$H$_b$ (Tyr))), 1.58-1.51 (m, 4H, CH$_2$CH$_2$SCH$_2$CH$_2$), 1.50-1.41 (m, 2H, NHCH$_2$CH$_2$), 1.33-1.28 (m, 14H, 7CH$_2$), 0.91-0.88 (t, 3H, CH$_3$CH$_2$), $^{31}$P NMR (202 MHz, CD$_3$OD) δ 13.32. LR-MS: m/z calcd 720.38 (M-H)$^-$, found 720.69 (M-H)$^-$.

4-((S)-2-amino-3-(((Z)-octadec-9-en-1-yl)amino)-3-oxopropyl)phenyl hydrogen ((((S)-1-(4-amino-2-oxopyrimidin-1(2H)-yl)-3-hydroxypropan-2-yl)oxy)methyl)phosphonate 15e Overall yield 21%. Obtained as TFA salt. $^1$H NMR (400 MHz, CD$_3$OD): δ 7.64 (s, 1H), 7.18-7.12 (m, 2H, aromatic), 7.11-7.09 (m, 2H, aromatic), 5.81 (s, 1H, 5-H), 5.38-5.33 (m, J=14.0 Hz, 2H, CH=CH), 4.06 (dd, J=3.4, 13.9 Hz, 1H, CH$_a$H$_b$N), 3.98-3.94 (m, 1H, CHNH$_2$), 3.83-3.77 (m, 2H, CH$_a$H$_b$N, CH$_a$H$_b$P), 3.75-3.64 (m, 3H, CHOH, CH$_a$H$_b$P, CH$_a$H$_b$O), 3.52-3.48 (dd, J=3.9, 12.1 Hz, 1H, CH$_a$H$_b$O), 3.23-3.19 (m, 2H, NHCH$_2$), 3.15 (dd, J=6.0, 14.1 Hz, 1H, CH$_a$H$_b$(Tyr)), 2.95-2.88 (dd, J=8.5, 14.0 Hz, 1H, CH$_a$H$_b$ (Tyr)), 2.07-1.94 (m, 4H, CH$_2$CH=CHCH$_2$), 1.51 (m, 2H, COCH$_2$CH$_2$), 1.41-1.11 (m, 22H, 11CH$_2$), 0.91-0.88 (m, 3H, CH$_3$CH$_2$). $^{31}$P NMR (500 MHz, CD$_3$OD): δ 14.49 (s). LR-MS: m/z calcd 690.4001 (M-H)$^-$, found 690.4 (M-H)$^-$.

4-((S)-2-amino-3-(((E)-octadec-9-en-1-yl)amino)-3-oxopropyl)phenyl hydrogen ((((S)-1-(4-amino-2-oxopyrimidin-1(2H)-yl)-3-hydroxypropan-2-yl)oxy)methyl)phosphonate 15f Overall yield 26%. $^1$H NMR (400 MHz, CD$_3$OD): δ 7.64 (s, 1H), 7.18-7.12 (m, 2H, aromatic), 7.11-7.09 (m, 2H, aromatic), 5.81 (s, 1H, 5-H), 5.38-5.33 (m, J=18.9 Hz, 2H, CH=CH), 4.07 (dd, J=3.4, 13.9 Hz, 1H, CH$_a$H$_b$N), 3.98-3.95 (m, 1H, CHNH$_2$), 3.81-3.77 (m, 2H, CH$_a$H$_b$N, CH$_a$H$_b$P), 3.75-3.64 (m, 3H, CHOH, CH$_a$H$_b$P, CH$_a$H$_b$O), 3.52-3.48 (dd, J=3.9, 12.1 Hz, 1H, CH$_a$H$_b$O), 3.23-3.18 (m, 2H, NHCH$_2$), 3.15 (dd, J=6.0, 14.1 Hz, 1H, CH$_a$H$_b$(Tyr)), 2.95-2.88 (dd, J=8.5, 14.0 Hz, 1H, CH$_a$H$_b$(Tyr)), 2.00-1.94 (m, 4H, CH$_2$CH=CHCH$_2$), 1.51 (m, 2H, COCH$_2$CH$_2$), 1.41-1.11 (m, 22H, 11CH$_2$), 0.91-0.88 (m, 3H, CH$_3$CH$_2$). $^{31}$P NMR (500 MHz, CD$_3$OD): δ 14.2 (s). LR-MS: m/z calcd 690.4001 (M-H)$^-$, found 690.4 (M-H)$^-$.

4-((S)-2-amino-3-((7-(octyloxy)heptyl)amino)-3-oxopropyl)phenyl hydrogen ((((S)-1-(4-amino-2-oxopyrimidin-1(2H)-yl)-3-hydroxypropan-2-yl)oxy)methyl)phosphonate 15 g Overall yield 15%; 1H NMR (400 MHz, CD$_3$OD) δ 7.60-7.59 (d, J=4 Hz, 1H), 7.15-7.08 (m, 4H, aromatic(Tyr)), 5.79-5.78 (m, 1H), 4.04-4.01 (m, 1H, CH$_a$H$_b$N), 3.91-3.88 (m, 1H, CH$_a$H$_b$N), 3.80-3.76 (m, 2H, CH$_2$OH), 3.72-3.65 (m, 3H, CH$_a$H$_b$P, CHNH), 3.50-3.48 (dd, 1H, CHNH), 3.42-3.39 (m, 4H, CH$_2$OCH$_2$), 3.19-3.17 (m, 2H, CH$_2$NHCO), 3.12-3.08 (m, 1H, J=3.5, 10.3 Hz, CH$_a$H$_b$ (Tyr)), 2.92-2.88 (m, 1H, CH$_a$H$_b$ (Tyr))), 1.57-1.50 (m, 4H, CH$_2$CH$_2$OCH$_2$CH$_2$), 1.50-1.47 (m, 2H, NHCH$_2$CH$_2$), 1.37-1.26 (m, 18H, 9CH$_2$), 0.90-0.88 (t, 3H, CH$_3$CH$_2$), $^{31}$P NMR (202 MHz, CD$_3$OD) δ 13.86. LR-MS: m/z calcd 666.37 (M-H)$^-$, found 666.61 (M-H)$^-$.

4-((S)-2-amino-3-((8-(octylthio)octyl)amino)-3-oxopropyl)phenyl hydrogen ((((S)-1-(4-amino-2-oxopyrimidin-1(2H)-yl)-3-hydroxypropan-2-yl)oxy)methyl)phosphonate 15 h Overall yield 11%; 1H NMR (400 MHz, CD$_3$OD) δ 7.60-7.59 (d, J=4 Hz, 1H), 7.16-7.09 (m, 4H, aromatic(Tyr)), 5.80 (m, 1H), 4.04-4.01 (m, 1H), 3.83-3.77 (m, 3H, CH$_a$H$_b$N, CH$_2$OH), 3.73-3.66 (m, 3H, CH$_a$H$_b$N, CH$_a$H$_b$P), 3.52-3.49 (m, 1H, CH$_a$H$_b$(Tyr)), 3.20-3.16 (m, 2H, CH$_2$NHCO), 3.10-3.06 (m, 1H), 2.91-2.87 (m, 1H, CH$_a$H$_b$ (Tyr)), 2.51-2.48 (m, 4H, CH$_2$SCH$_2$), 1.59-1.53 (m, 4H, CH$_2$CH$_2$SCH$_2$CH$_2$), 1.50-1.45 (m, 2H, NHCH$_2$CH$_2$), 1.42-1.38 (m, 4H, CH$_2$CH$_2$CH$_2$SCH$_2$CH$_2$CH$_2$), 1.34-1.28 (m, 12H, 6CH$_2$) 0.91-0.89 (t, 3H, CH$_3$CH$_2$), $^1$P NMR (202 MHz, CD$_3$OD) δ 13.31. LR-MS: m/z calcd 696.87 (M-H)$^-$, found 696.80 (M-H)$^-$.

REFERENCES

The following publications are incorporated by reference in their entirety:
1. E. De Clercq, *Antiviral Res.*, 2007, 75, 1-13.
2. E. De Clercq, A. Holy, I. Rosenberg, T. Sakuma, J. Balzarini and P. C. Maudgal, *Nature* (*London*), 1986, 323, 464-467.
3. E. De Clercq, T. Sakuma, M. Baba, R. Pauwels, J. Balzarini, I. Rosenberg and A. Holy, *Antiviral Res.*, 1987, 8, 261-272.
4. K. C. Cundy, A. M. Bidgood, G. Lynch, J.-P. Shaw, L. Griffin and W. A. Lee, *Drug Metabolism and Disposition*, 1996, 24, 745-752.
5. K. C. Cundy, Z.-H. Li, M. J. M. Hitchcock and W. A. Lee, *Drug Metabolism and Disposition*, 1996, 24, 738-744.
6. M. K. Bijsterbosch, L. J. J. W. Smeijsters and T. J. C. Van Berkel, *Antimicrobial Agents and Chemotherapy*, 1998, 42, 1146-1150.
7. L. W. Peterson and C. E. McKenna, *Expert Opin. Drug Delivery*, 2009, 6, 405-420.
8. I. S. Krylov, B. A. Kashemirov, J. M. Hilfinger and C. E. McKenna, *Molecular Pharmaceutics*, 2013, 10, 445-458.
9. WIPO Publication WO 2012-US36846 2012154698, 2012.
10. MarvineSketch 15.12.14.0.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the invention and the following claims.

What is claimed is:
1. A compound of the following formula:

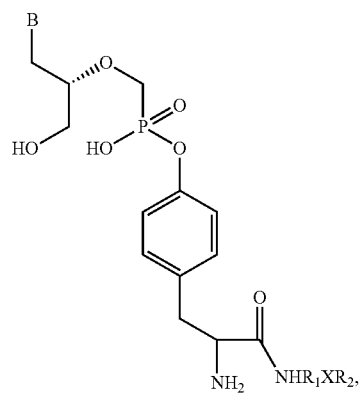

or a salt or a pharmaceutically acceptable salt thereof,
wherein B is a naturally occurring or non-naturally occurring base; R$_1$ is a C$_2$-C$_{14}$ alkyl group; X is O, S, CH=CH (cis) or CH=CH (trans); and R$_2$ is a C$_2$-C$_{14}$ alkyl group.
2. The compound of claim 1, wherein B is adenine or cytosine.

3. The compound of claim 1, or a salt or a pharmaceutically acceptable salt thereof, selected from
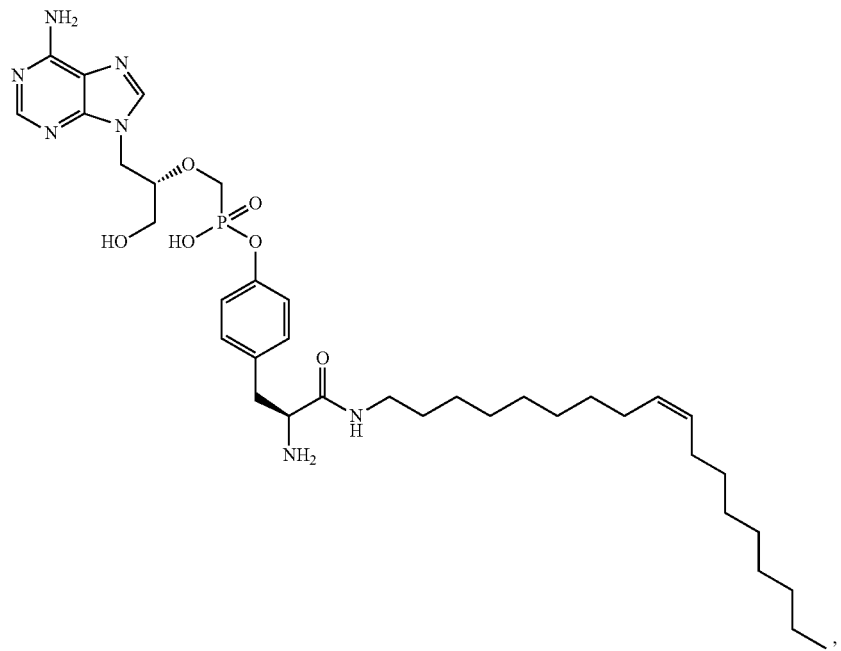
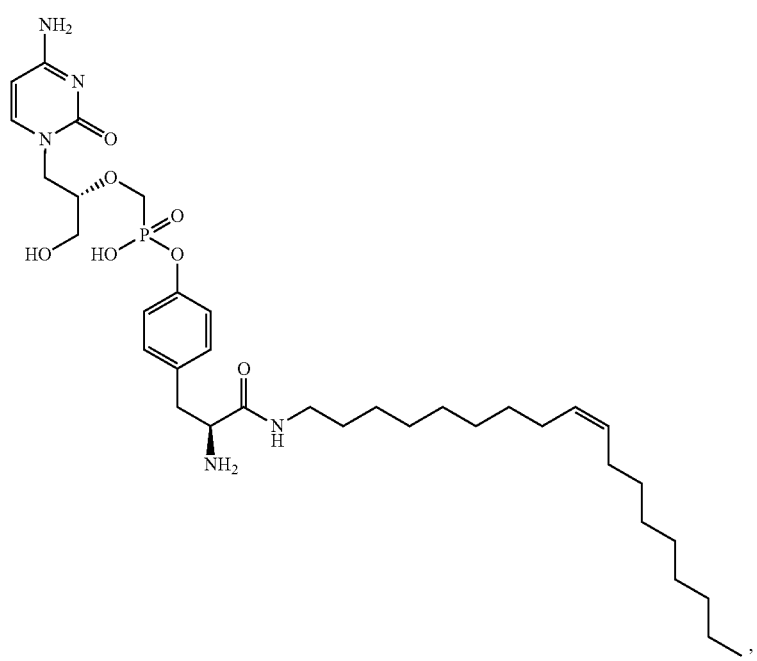
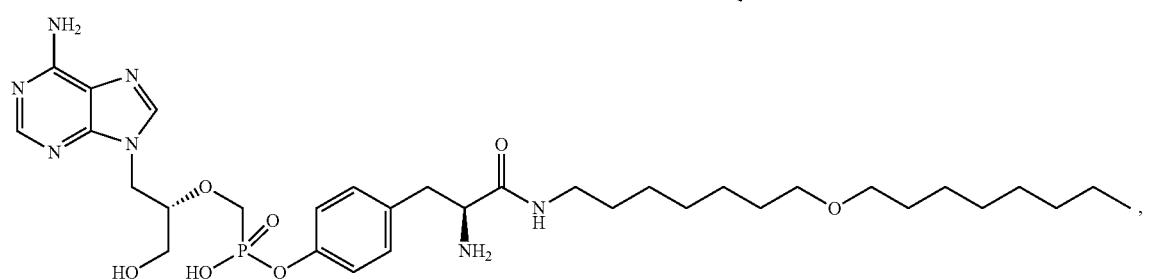

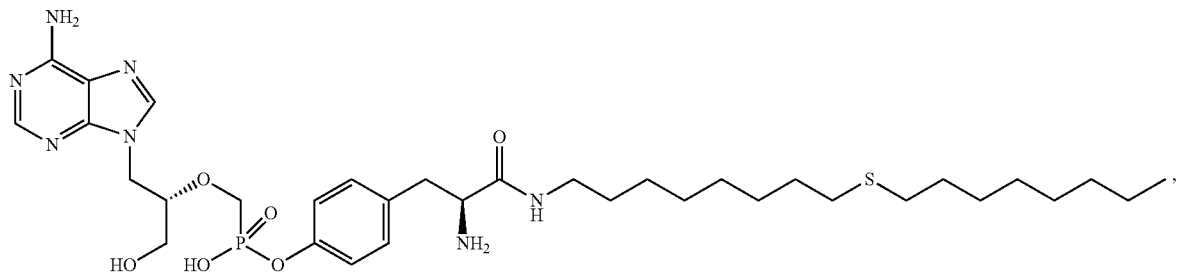
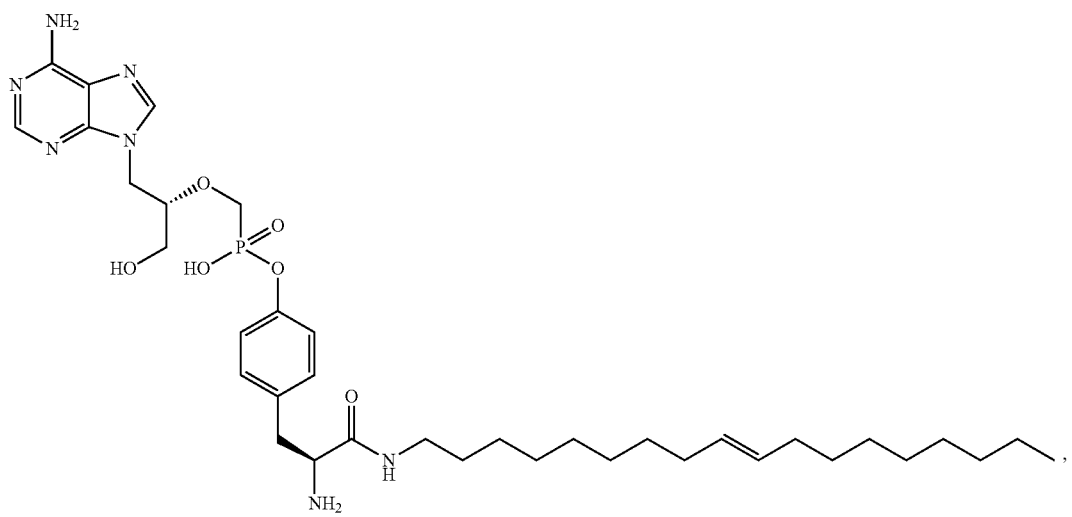
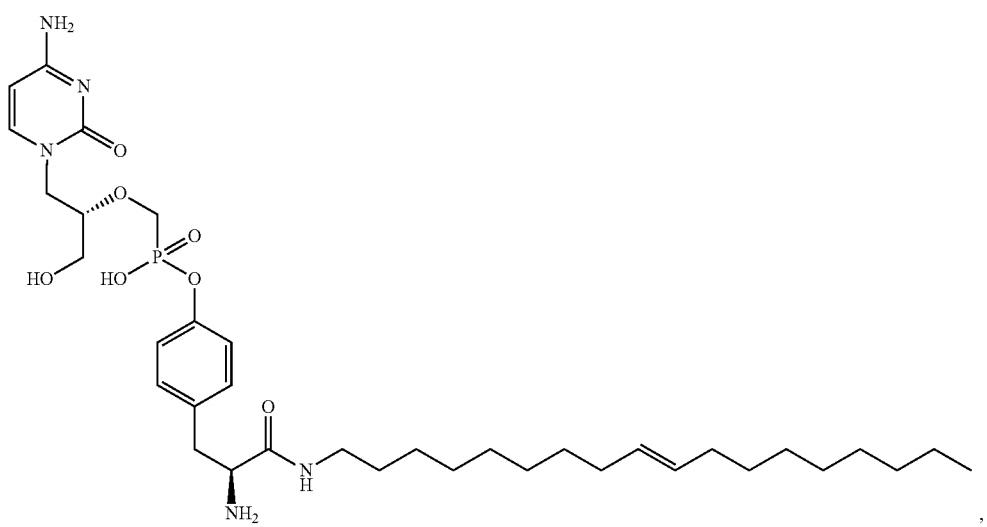
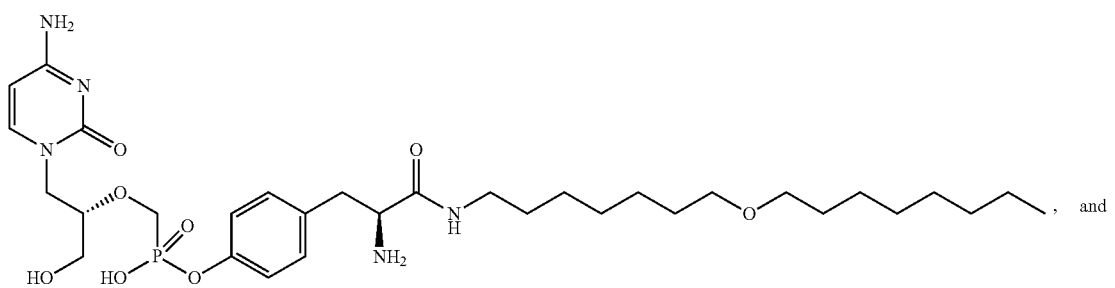

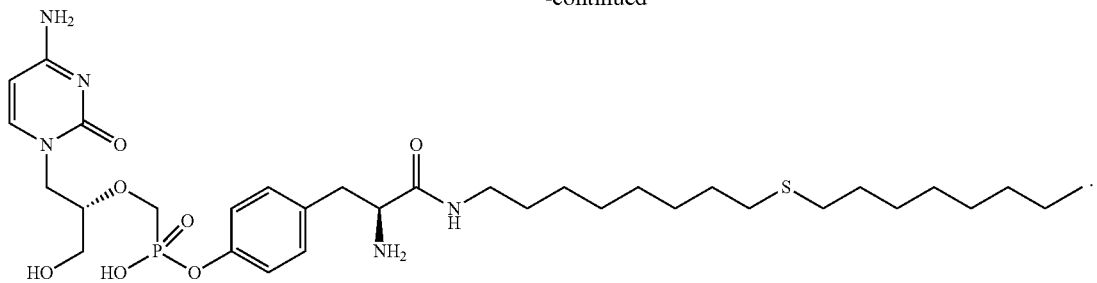

4. The compound of claim 1, wherein $NHR_1XR_2$ is: $NHC_8H_{16}CH=CHC_8H_{17}$ (cis); $NHC_8H_{16}CH=CHC_8H_{17}$ (trans); $NHC_7H_{14}OC_8H_{17}$; or $NHC_7H_{14}SC_8H_{17}$.

5. A pharmaceutical composition comprising a compound of claim 1 and a pharmaceutically acceptable carrier.

6. A method of inhibiting viral replication in a virus-infected cell in need thereof, comprising exposing the cell in culture to a compound of claim 1.

7. A method of treating a virus infection in a subject in need thereof, comprising administering to the subject a therapeutically effective amount of a compound of claim 1.

8. A method of preparing a nucleoside phosphonate, comprising
   reacting a Boc-protected amino acid amide with (S)-HPMPA or (S)-HPMPC to form a Boc-protected cyclic nucleoside phosphonate;
   deprotecting the cyclic nucleoside phosphonate; and
   ring-opening the deprotected cyclic nucleoside phosphonate to produce an acyclic nucleoside phosphonate.

9. The method of claim 8, wherein the Boc-protected amino acid amide is
   (S,Z)-2-amino-3-(4-hydroxyphenyl)-N-(octadec-9-en-1-yl)propanamide,
   (S,E)-2-amino-3-(4-hydroxyphenyl)-N-(octadec-9-en-1-yl)propanamide,
   tert-butyl (3-(4-hydroxyphenyl)-1-((7-(octyloxy)heptyl)amino)-1-oxopropan-2-yl)carbamate, or
   tert-butyl (3-(4-hydroxyphenyl)-1-((7-(octylthio)heptyl)amino)-1-oxopropan-2-yl)carbamate.

10. The method of claim 8 wherein the acyclic nucleoside phosphonate comprises a compound of the following formula:

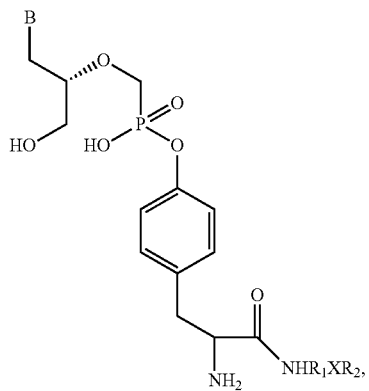

or a salt or a pharmaceutically acceptable salt thereof, B is a naturally occurring or non-naturally occurring base; wherein X is O, S, CH=CH (cis) or CH=CH (trans), and $R_1$ and $R_2$ are each independently a $C_2$-$C_8$ alkyl group.

11. The method of claim 10, wherein B is adenine or cytosine.

* * * * *